(12) United States Patent
Brugger et al.

(10) Patent No.: US 6,690,197 B2
(45) Date of Patent: Feb. 10, 2004

(54) APPARATUS FOR FEEDING A BUS

(75) Inventors: Daniel Brugger, Menzingen (CH);
Norbert Fichtner, Schierling (DE);
Fritz Jost, Mettmenstetten (CH)

(73) Assignee: Siemens Building Technologies AG (CH)

( * ) Notice: Subject to any disclaimer, the term of this patent is extended or adjusted under 35 U.S.C. 154(b) by 57 days.

(21) Appl. No.: 10/044,790

(22) Filed: Jan. 11, 2002

(65) Prior Publication Data
US 2002/0095542 A1 Jul. 18, 2002

(30) Foreign Application Priority Data
Jan. 17, 2001 (EP) .............................. 01100959

(51) Int. Cl.[7] ......................................... H03K 19/0175
(52) U.S. Cl. ............................. 326/86; 326/21; 326/82; 326/90
(58) Field of Search .............................. 326/21, 30–34, 326/82, 83, 86, 90; 710/316; 379/412, 413

(56) References Cited

U.S. PATENT DOCUMENTS 5,043,606 A  8/1991  Lewis
5,392,349 A  * 2/1995  Elder, Jr. ..................... 379/412
6,188,764 B1 * 2/2001  Huang et al. ................. 379/412

FOREIGN PATENT DOCUMENTS

EP            0 749 070            12/1986

* cited by examiner

Primary Examiner—Michael Tokar
Assistant Examiner—Anh Tran
(74) Attorney, Agent, or Firm—Greer, Burns & Crain, Ltd.

(57) ABSTRACT

A bus subscriber node (2) having a feed module (10) and means (9) for transmitting and/or receiving information by way of the bus (1) has a switch module (11) which is actuatable by way of a switching logical member (12) and by which the feed module (10) can be connected to the bus (1) or by which the feed module (10) can be separated from the bus (1). The bus subscriber node (2) also has a memory cell (14) and a monitoring member (13) for detecting a current supplied by the feed module (10). The switching logical member (12) is coupled to the memory cell (14) and the monitoring member (13) in such a way that the feed module (10) can be separated from the bus (1) on the basis of an item of information stored in the memory cell (14) or on the basis of a certain current level detected by the monitoring member (13). With the memory cell (14) the bus subscriber node (2) can be configured as a feeding or as a non-feeding bus subscriber node and can be used in communication networks with central and decentral feed.

7 Claims, 3 Drawing Sheets

APPARATUS FOR FEEDING A BUS

BACKGROUND OF THE INVENTION

1. Field of the Invention

The invention relates to an apparatus for connection to a bus.

Such apparatuses are suitable for the energy supply for a bus which carries information and energy for bus subscribers. The apparatus is preferably used in a building automation installation—which is also referred to as a building management system. In the building automation installation a plurality of bus subscribers are generally connected together by way of a bus, in which respect a bus subscriber is by way of example a device for monitoring, controlling, and/or regulating process parameters such as for example room temperature, air humidity or brightness.

2. Description of the Prior Art

Decentrally fed buses are known, in which each bus subscriber is either a feeding or a non-feeding bus subscriber. Also known are centrally fed buses in which the bus feed is effected exclusively from a single central feed, while the other bus subscribers are non-feeding bus subscribers.

A bus subscriber node is known (EP 0 749 070 A) which has a feed module, a decision device and a measuring device for detecting the electrical current situation. The decision device decides automatically and only on the basis of the electrical current situation whether the feed module is or is not feeding the bus.

It has been found that bus systems with few subscriber nodes are advantageously fed decentrally but bus systems with relatively many subscriber nodes are more advantageously fed centrally. It is certainly realistic that, in the case of a bus system which varies in terms of the degree of expansion, as from a certain moment in time the nature of the feed is advantageously also to be adapted from central to decentral or vice-versa.

SUMMARY OF THE INVENTION

The object of the present invention is to propose a bus subscriber node for bus systems which can be fed centrally or decentrally, which node can be configured as a feeding or as a non-feeding bus subscriber node and can be implemented at low cost.

According to the present invention, there is provided apparatus for connection to a bus comprising
  means for transmitting and/or receiving information by way of the bus,
  a feed module,
  a switch module which is actuatable by way of a switching logical member and by which the feed module can be connected to the bus or by which the feed module can be separated from the bus,
  a monitoring member for detecting a current supplied by the feed module, and
  a memory cell, wherein
  the switching logical member is coupled to the memory cell and the monitoring member in such a way that the feed module can be separated from the bus on the basis of an item of information stored in the memory cell or on the basis of a certain current level detected by the monitoring member.

Advantageous features are set forth in the dependent claims.

BRIEF DESCRIPTION OF THE DRAWINGS

Embodiments of the invention are described in greater detail hereinafter with reference to the drawings in which.

DESCRIPTION OF THE PREFERRED EMBODIMENTS

Figure 1:
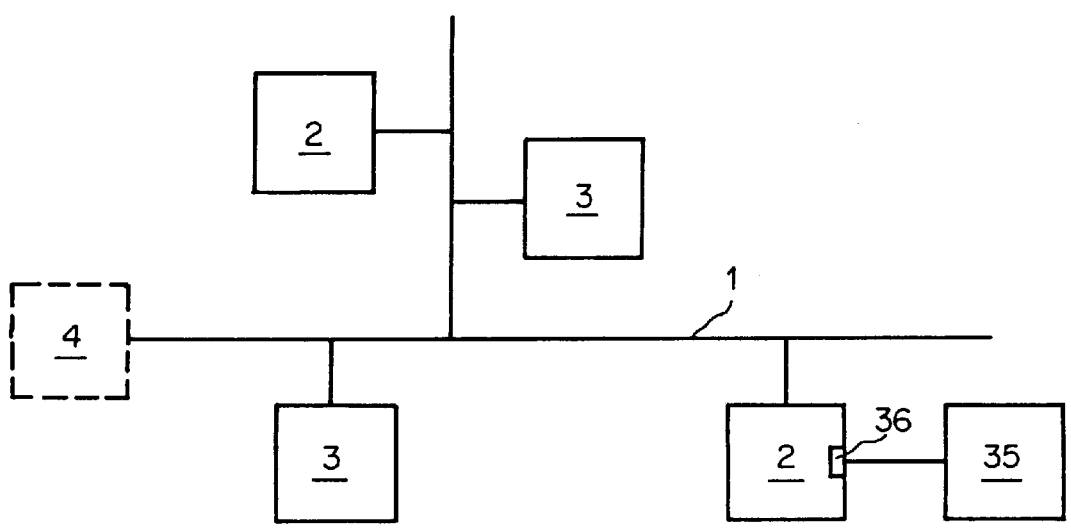
FIG. 1 shows a data communication network with a bus and subscriber nodes.

In FIG. 1 reference 1 denotes a bus and references 2 and 3 denote a plurality of bus subscriber nodes which are connected to the bus and which are generally arranged distributed spatially on the bus 1.

A first configurable variant 2 of the bus subscriber nodes has its own electrical feed which can be used to feed the bus 1. A second variant 3 of the bus subscriber nodes does not have its own feed device. If necessary—and therefore shown in broken line—a central feed device 4 is connected to the bus 1.

The bus 1 serves both for information and also energy transmission and is preferably a two-wire bus, for example a twisted pair.

Figure 2:
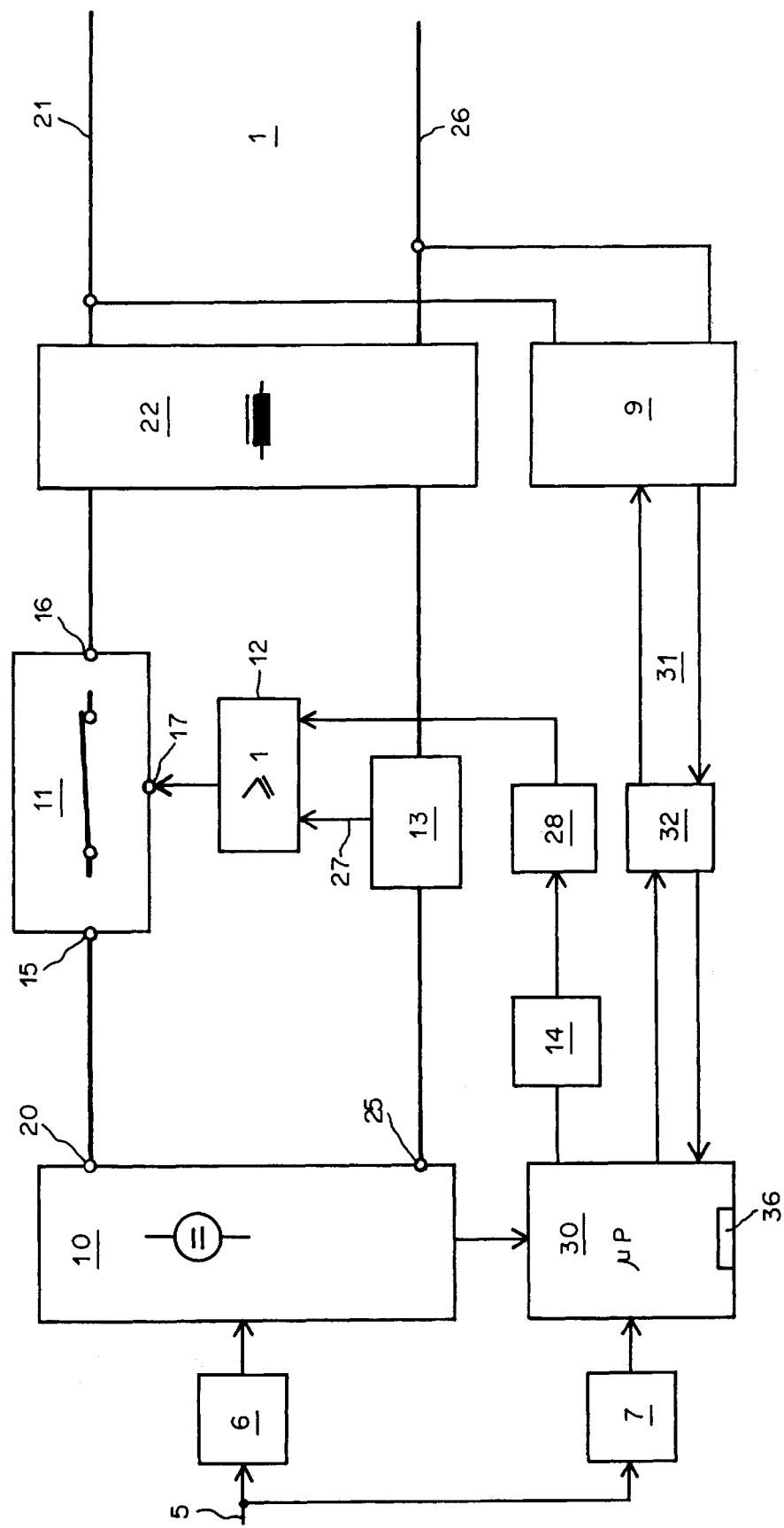
FIG. 2 shows a block circuit diagram of a configurable subscriber node.

A bus subscriber node 2 shown in FIG. 2 has a transmitter-receiver 9, a feed module 10, a switch module 11, a switching logical member 12, a monitoring member 13 and a memory cell 14. The switch module 11 has a voltage input 15, a voltage output 16 and a control input 17.

The feed module 10 is connected looped by way of the switch module 11 to the bus 1 so that depending on the respective state of the switch module 11 the feed module 10 feeds the bus 1 or is separated from the bus 1.

In an advantageous embodiment of the bus subscriber node 2 the voltage input 15 of the switch module 11 is connected to a first pole 20 of the feed module 10. The voltage output 16 is put on to a first line 21 of the bus 1, with the voltage output 16 advantageously being connected to the first line 21 by way of a choke module 22. A second pole 25 of the feed module 10 is taken by way of the monitoring member 13 on to a second line 26 of the bus 1, with the choke module 22 again advantageously being connected therebetween. On the output side the switching logical member 12 is connected to the control input 17 of the switch module 11. On the input side the switching logical member 12 is connected to an output 27 of the monitoring member 13 and to the memory cell 14, while if necessary a galvanic separating element 28, for example an opto-coupler, is inserted for potential separation between the memory cell 14 and the switching logical member 12.

The information in the memory cell 14 is variable by a microprocessor 30. It will be self-evident that, instead of the microprocessor 30, it is also possible to use a microcomputer with integrated output ports, in which case the memory cell 14 is advantageously embodied by an output port of the microcomputer.

The transmitter-receiver 9 is connected to the bus 1 and by way of a bidirectional signal line 31 to the microprocessor 30 and is embodied by way of example in the form of what is known as an UART-component (universal asynchronous receiver transmitter). If for example a microcomputer is used instead of the microprocessor 30 the transmitter-receiver 9 can also be integrated in the microcomputer.

If necessary the bidirectional signal line 31 between the microprocessor 30 and the transmitter-receiver 9 has further galvanic separation elements 32, for example opto-couplers.

A current flowing between the feed module 10 and the bus 1 can be measured by the monitoring member 13. The monitoring member 13 is so designed in functional terms that the output 27 delivers a pre-defined signal if the measured current exceeds a given level. The switching logical member 12 is coupled to the memory cell 14 and the monitoring member 13 in such a way that the feed module 10 can be separated from the bus 1 by the switch module 11 which is controlled by the switching logical member 12, on the basis of an item of information stored in the memory cell 14 or on the basis of a certain current level detected by the monitoring member 13.

The information of the memory cell 14 can be set by way of the microprocessor 13 in such a way that the feed module 10 is basically connected to the bus 1 by way of the switch module 11 or is separated from the bus 1, so that therefore the bus subscriber node 2 can be configured as a feeding or non-feeding bus subscriber node 2. An instruction for varying the information in the memory cell 14 can basically be inputted by way of the bus 1 via the transmitter-receiver 9 or however by way of a service device 35 connected to the subscriber node 2 (FIG. 1). In the latter case the subscriber node 2 advantageously has a terminal connection 36 connected to the microprocessor 30.

An electrical current supply 5 for the feed module 10 and the microprocessor 30 is advantageously taken separated galvanically by way of transformer windings 6 and 7 to the feed module 10 and to the microprocessor 30.

Figure 3:
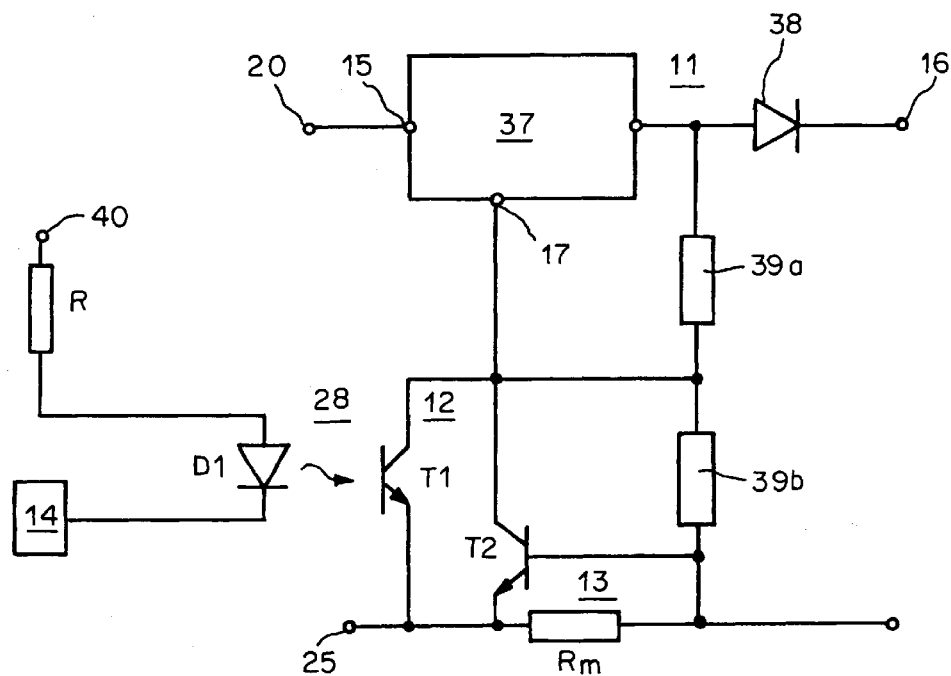
FIG. 3 shows a control circuit for a switch module of the subscriber node.

In an inexpensive implementation of the subscriber node 2, a control circuit in accordance with the structure shown in principle in FIG. 3 is advantageously employed. In an advantageous implementation, the switch module 11 (FIG. 2) is essentially embodied by a commercially available integrated voltage regulator 37 with three connections, which is connected on the output side to a diode 38 and a voltage divider 39a and 39b, wherein the tapping of the voltage divider 39a, 39b is passed to the control input 17. By way of example the voltage regulator is an LM317 from National Semiconductor. The functionality of the switching logical member 12 is essentially achieved by two transistors T1 and T2 connected at the collector side to the control input 17 of the switch module 11 or the voltage regulator 37. A first transistor T1 is the output circuit of the galvanic separating element 28 which is in the form of an opto-coupler. A photodiode D1 of the input circuit of the galvanic separating element 28 is connected to the memory cell 14 and by way of a resistor R to a suitable feed potential 40. A second transistor T2 is also a part of the monitoring member 13 which also includes a measuring resistor Rm for detecting a current flowing between the feed module 10 (FIG. 2) and the bus.

The choke module 32 and the transmitter-receiver 9 are matched to each other in such a way that it is possible to effect bit encoding in accordance with a desired standard, by way of example in accordance with the EIB (European Installation Bus) for a Twisted Pair (EIBA Handbook Series, System Specifications, Medium Dependent Layers, EIB implementation on Twisted Pair).

Figure 4:
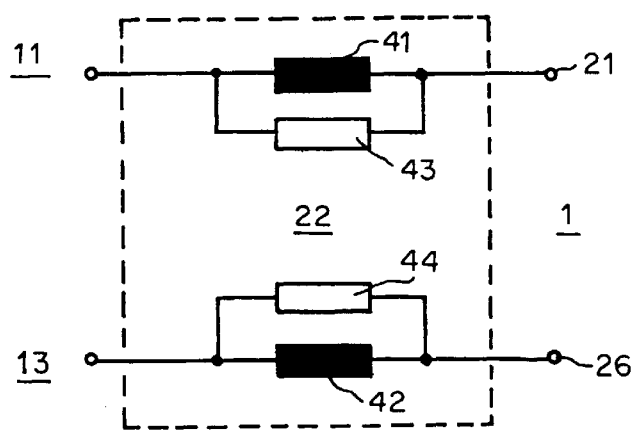
FIG. 4 shows a choke module of the subscriber node.

The choke module 22 advantageously has choke coils 41 and 42 (FIG. 4), wherein a first choke coil 41 is in principle arranged in series between the first pole 20 of the feed module 10 and the first line 21 of the bus 1 and a second choke coil 42 is arranged in series between the second pole 25 of the feed module 10 and the second line 26 of the bus 1. When transposed to the control circuit shown in FIG. 3 the first choke coil 41 is arranged between the first pole 20 of the feed module 10, which is switched by the switch module 11, and the first line 21 of the bus 1, and the second choke coil 42 is arranged between the second pole 25 of the feed module 10, which is monitored by the monitoring module 13, and the second line 26 of the bus 1. The subscriber node 2 can be adapted in optimum fashion to the bus 2 if ohmic resistors 43 and 44 are arranged parallel to the choke coils 41 and 42.

The subscriber node 2 with the feed module 10, the switch module 11, the switching logical member 12, the memory cell 14 and the monitoring member 13 can be used in communication networks with a central or decentral feed as the feed module 10 can be configured under software control on the basis of an item of information stored in the memory cell 14, as a feeding or non-feeding subscriber node.

We claim:

1. Apparatus for connection to a bus comprising
means for transmitting and/or receiving information by way of the bus,
a feed module,
a switch module which is actuatable by way of a switching logical member and by which the feed module can be connected to the bus or by which the feed module can be separated from the bus,
a monitoring member for detecting a current supplied by the feed module, and
a memory cell, wherein
the switching logical member is coupled to the memory cell and the monitoring member in such a way that the feed module can be separated from the bus on the basis of an item of information stored in the memory cell or on the basis of a certain current level detected by the monitoring member.

2. Apparatus as set forth in claim 1, wherein the bus is a two-wire bus.

3. Apparatus as set forth in claim 1, wherein the information in the memory cell can be varied by a microprocessor or microcomputer.

4. Apparatus as set forth in claim 3, wherein the memory cell is embodied by an output port of the microprocessor or microcomputer.

5. Apparatus as set forth in claim 1, wherein the information in the memory cell is connected to a switching logical member by way of a galvanic separation means.

6. Apparatus as set forth in claim 1, wherein the switch module has an integrated voltage regulator.

7. Apparatus as set forth in claim 1, further comprising a choke module with at least one coil arranged in serial relationship in a bus feed line.

* * * * *